Patented July 29, 1947

2,424,787

UNITED STATES PATENT OFFICE 2,424,787

METHOD OF MAKING A PHENOL FORM-
ALDEHYDE MOLDING COMPOSITION

William H. Adams, Jr., Newark, Del., assignor to
Haveg Corporation, Newark, N. J., a corporation of Delaware No Drawing. Application August 7, 1942,
Serial No. 454,065

10 Claims. (Cl. 260—38)

The present invention relates to a process of preparing phenol-formaldehyde molding compounds, and to the molding compounds thus prepared. More particularly, it relates to the preparation of a molding compound of the one-stage type which can be prepared without danger of conversion of the heat-convertible resin into the infusible, insoluble form and during the manufacture of which long-fibered fillers may be incorporated therewith, if desired, without destruction of their fibrous characteristics.

At the present time, there are two major types of phenol-formaldehyde resins available for the production of molding compounds, designated respectively "one-stage" and "two-stage" resins, and the use of each of these types possesses certain disadvantages. The two-stage type of resin, however, is the one most universally used in the industry for the production of molding compounds.

The two-stage type of resin is made by reacting phenol with an amount of formaldehyde much less than required for heat-convertibility, usually in the presence of an acid catalyst. The resin so prepared is permanently fusible, and it can, therefore, be completely dehydrated, if desired, without danger of conversion of the resin into the infusible product. The resins of this type are generally dehydrated to the point where the liquid reaction product removed from the reactor cools to form a brittle grindable solid, not requiring further drying.

The product, after grinding, is mixed with various fillers, such as wood-flour, asbestos and the like, and at or about the same time, further amounts of a methylene-containing compound, usually hexamethylenetetramine, is added in an amount necessary to render the resin potentially reactive. This mixture requires further treatment, which is usually carried out on heated differential compounding rolls, to compact the mass, to initiate the reaction between the resin and the added methylene-containing compound, and to advance the cure to the desired point. Products so prepared are not as uniformly mixed as is often desired and the compounding rolls disintegrate, to a large extent, any fillers that may have been added as relatively long-fibered material, such as long-fibered asbestos. The presence of this type of filler is advantageous in many molded products, and attempts have been made to devise a method by which they might be retained in long-fibered form in the molding compound.

The one-stage type of resin has been used to a limited extent in the production of a molding compound. Such a resin is prepared by reacting phenol with all of the formaldehyde necessary for heat-convertibility in the presence of a basic catalyst. Resins of this type are inexpensive to make, but are very critical, since if the reaction is carried too far, the resin may polymerize to the infusible stage, spontaneously in the reactor. Because of this danger, the resin reaction is seldom carried beyond the production of a thick syrup, containing a considerable amount of water.

To make a molding composition from this type of resin, it is necessary to mix the syrup with the filler, and the mixture is then dried to remove the moisture. In most cases, mixing on the compounding rolls is also required in order to compact the mass and to bring the cure to the correct point, which, as in the case of the two-stage resin, disintegrates long-fibered fillers. Resins of this type are very difficult to dry and to compound, as they tend to polymerize spontaneously when a certain critical point is reached. The drying step is further rendered difficult by the fact that the water content is so great that much time is required, and the resin retains the water tenaciously. If the water is not sufficiently removed, the resulting resins are also difficult to mold due to their tendency to ooze out of the mold upon the application of heat and pressure, and the mixture frequently adheres so tenaciously to the mold that both it and the molded product may be damaged. Finally, a resin containing residual water is often blistered or cracked during the curing, resulting in worthless molded articles. On the other hand, if the material is heated sufficiently to remove the water, the products are deficient in flow.

One object of the present invention is to provide a method of preparing a molding composition from a one-stage phenol-formaldehyde resin, which not only overcomes the difficulties previously encountered in the attempts to prepare a molding compound from such resins, but also is superior in many respects to the processes heretofore used in preparing molding compounds from two-stage resins.

A further object of the invention is to provide a simple and expedient method by which a satisfactory molding compound can be obtained from a one-stage phenol-formaldehyde resin without danger of conversion of the resin into the infusible stage.

Still another object of the present invention is to provide a method of making a phenol-formaldehyde resinous molding compound containing relatively long-fibered fillers, such as long-fibered asbestos.

Other objects, including the provision of a novel molding composition, will be apparent from a consideration of the specification and claims.

In accordance with the preferred embodiment of the present invention, an alkali metal or an alkaline earth metal oxide, such as sodium, potassium, lithium, calcium, barium, strontium or magnesium oxide, is incorporated in a relatively small amount with a molding composition comprising a syrupy one-stage phenol-formaldehyde resin and a filler. Of these, the alkaline earth metal oxides are preferred, and the use of magnesium oxide is particularly advantageous. The addition of the oxide to the molding composition of the type described causes the composition to harden at room temperature or at a slightly elevated temperature, that is, it leads to the solidification thereof. This solidification does not convert the resin into the final infusible, insoluble stage, and the solidified product may be easily molded under heat and pressure to form a satisfactory molded product.

In another embodiment of the invention, the oxide is added to the one-stage phenol-formaldehyde resin in the absence of a filler and a corresponding stiffening or hardening takes place, although unless heat is applied, the rate of hardening is very much slower.

In the production of a molding compound in which a filler is incorporated, the filler is mixed with the syrupy resin prior to the thickening of the resin caused by the addition of the alkali or alkaline earth metal oxide; and since the resin is in liquid form, a uniform mixture is easily obtained. The oxide may be added to the syrupy resin prior to, subsequent to, or with the filler. The product hardened by means of the oxide may be directly molded, the use of compounding rolls not being required, and, therefore, the filler is not subjected to any significant disintegrating or destructive action in the process. If a long-fibered filler, such as long-fibered asbestos is employed, the process insures the presence of the fibers in this form in the molding composition.

In order to produce a molding composition in accordance with the present invention, a one-stage syrupy resin is mixed with the filler and the oxide, and such modifying agents, lubricants and the like as may be desirable, in an ordinary dough mixer, kneader or similar device. The filler may be any suitable material, such as wood-flour, cotton linters, shredded fabric, small irregular pieces of fabric, long- or short-fibered asbestos, mica, slate dust and the like. The mixing may take place at room temperature, but, if desired, in order to shorten the time, a slightly elevated temperature, for example, about 30° C. to 55° C. may be employed, which is usually developed by the frictional heat generated during the mixing. The mixing is continued until the mass is thoroughly mixed, and preferably, but not necessarily, until the mass begins to show a tendency to thicken. The time of mixing is not critical, and depends on the temperature, the viscosity of the particular resin, and the type of mixer employed. Usually mixing for about three to twenty minutes will result in a thickening of the resin. With most resins, the mixing will be completed in less than ten minutes. When the mixing is completed, the material is removed from the mixer; and if it has been thickened, either in the mixer or by allowing it to stand, it may be immediately made into preforms, or may be sheeted either while still warm or after it has cooled. The material from the mixer, if allowed to stand until solidified, becomes a somewhat rubbery or leathery solid. The solidified resin-filler mixture may be obtained within an hour, or even less, but often several hours are required. When the fiber length of the filler is not important, the solidified product can be ground or otherwise disintegrated. The product so obtained is ready for molding. No drying is required, and it is unnecessary to use compounding rolls to promote the cure or to compact the material. The molding can be conducted under the heat and pressure conditions usually used in molding compounds made from phenol-formaldehyde two-stage resins, but it has been found that in many cases, very much lower pressures can be used, for example, a pressure in the neighborhood of 500 pounds per square inch, as contrasted with a pressure of about 2,000 pounds per square inch usually employed with the two-stage resins. The molding compound of the present invention has an extremely good flow in the mold, cures very rapidly, and may be withdrawn hot from the mold without any tendency to blister.

While the action of the alkali metal or alkaline earth metal oxide on the syrupy phenol-formaldehyde resin is not fully understood, the indications are that the solidification of the syrupy resin, without its conversion into the infusible stage, is caused by an actual coagulation of the resin, since the more hydrophilic the resin is, the more marked is the solidification action. The use of a resin produced from phenol, m-cresol, or mixtures of m- or p-cresol, or mixtures of these cresols with phenol are, therefore, preferred. In place of formaldehyde, any other methylene-containing compound, such as hexamethylenetetramine and furfural, may be used. The resin employed may be produced by any suitable process furnishing a one-stage phenol-formaldehyde resin in a syrupy condition. The term "one-stage phenol-formaldehyde resin" includes those resins in which a phenol, such as those mentioned, is reacted with a sufficient amount of a methylene-containing compound, in the presence of a suitable catalyst, to give a product which is heat-convertible without the addition of further quantities of a methylene-containing substance. As previously stated, the use of a resin having marked hydrophilic properties is preferred.

The resin in syrupy condition contains an appreciable amount of water and other volatile material, for example, it may contain a total volatile content of 8% to 35%, as determined by baking the resin in a shallow dish for twenty-four hours at 150° C., and of this 6% to 28% may be water. In a typical case, the total volatile content may be 18%, of which 12% may be water.

The filler may comprise, if desired, from 30% to 70%, by weight, of the total weight of the molding mixture. As previously stated, by the process, fillers of relatively long fibers, such as long-fibered asbestos, may be incorporated, with assurance that the filler in the fibrous form in which it is added to the resin will be present in the molding composition. By the invention, therefore, a molded product may be produced containing a filler of relatively long fibers.

A relatively small amount of magnesium oxide or other alkali metal or alkaline earth metal oxide is sufficient to convert the syrupy resin into the solidified product. While the quantity of oxide is not critical, in most instances the amount added will be between 1% and 15%, preferably between 2% and 6%, and generally in the neighborhood of 3%–4%, based on the weight of the syrupy resin. Amounts in excess of 15% may be used if desired, but since such amounts are not generally required, no advantage is to be gained thereby. The oxide added should be dry, and, for best results, a bone-dry or anhydrous oxide is employed.

In many instances, it will be desirable to include in the molding mixture a lubricant, for example, from 1% to 7% of calcium stearate, and this material may be added to the syrupy resin and mixed therewith at the same time that the oxide or the filler is incorporated therein. Plasticizers, other modifying agents, dyes, etc. may also be incorporated.

In a typical case, for example, 100 parts, by weight, of phenol, and 80 parts, by weight, of 40% formaldehyde solution and 5 parts, by weight, of concentrated ammonium hydroxide are refluxed gently together for about fifty minutes. The excess water is evaporated off, for example, by heating the resin in an open dish until a temperature of about 108° C. is reached, or by vacuum distillation at about 60° C. under 30 inches of vacuum. The resin at the completion of the reaction will contain about 25% total volatile, determined by baking the resin in a shallow dish for twenty-four hours at 150° C., and of this about 15% is water. It will be found that the cooled product is a fairly thick fluid which will remain fluid for several days. This thick fluid may be placed in a ball mill to which is added 3% to 4% of dry magnesium oxide, based on the weight of the resinous liquid. If a filler is to be included in the molding composition, the syrupy resin, the filler, and the oxide are mixed in a dough mixer or kneader. Advantageously, 50% of long-fibered asbestos, for example, is incorporated. If desired, a lubricant, plasticizer, or the like may be mixed with the resin or resin-filled mixture. In place of adding the magnesium oxide to the entire quantity of the liquid resin, the oxide may be added to a portion of the resin, for example 30% of magnesium oxide, based on the weight of the resin, may be mixed therewith, and this mixture may then be diluted without appreciable delay with sufficient liquid resin to bring the quantity of oxide, on the basis of the total resin, to the desired percentage. When uniformity of mixing has been obtained, the mixture is removed from the mixer. In the case of mixtures containing fillers, the development of the solid or rubbery state, due to the heat developed during the mixing, may take place as soon as the mixture has cooled—or in any event, will not be delayed more than a few hours. In the case where the oxide is added to the resin alone and no heat is applied, the complete solidification may not take place for a day or two, depending upon the volatile content of the resin, the amount, and dryness of the oxide employed. The product remains plastic at temperatures over 100° C., but is solid at room temperature. The solid may be used as a molding composition, as hereinbefore described—for example, it may be broken up and molded to the desired form by subjecting it to a temperature of about 135–150° C. at a pressure of about 500 pounds per square inch.

The process of the present invention makes it possible to produce from one-stage resins rapid curing and blister-free molding compositions which are easy to manipulate and control. The process eliminates the drying and compounding operations, and produces molding compounds comparing favorably in quality to the usual two-stage molding compositions, but at a very much lower cost. The elimination of the compounding step also makes it possible to use long-fibered fillers, such as asbestos, which would otherwise be broken down or destroyed in the compounding step.

Considerable modification is possible in the selection of the alkaline earth metal oxide and in the amount thereof employed, as well as in the steps of the process, without departing from the essential features of the invention.

I claim:

1. The process of preparing a heat-convertible molding composition in the form of a coagulated plastic product capable of being directly molded under heat and pressure, from a heat-convertible one-stage phenol-formaldehyde resinous product which is syrupy at room temperature, contains water and other volatile material, and has a total volatile content of from 8% to 35% as determined by baking the resin in a shallow dish for twenty-four hours at 150° C., of which volatile content at least 6% and not more than 28% is water, based on the weight of said syrupy resin, which comprises mixing with said syrupy resin a dry oxide selected from the group consisting of alkali metal oxides and alkaline earth metal oxides in an amount between 1% and 15% based on the weight of said syrupy resin to impart coagulability to said syrupy resin; and allowing said mixture to react to form a coagulated plastic product containing substantially the same amount of volatile material as the said syrupy resin.

2. The process of preparing a heat-convertible molding composition in the form of a coagulated plastic product, capable of being directly molded under heat and pressure, from a heat-convertible one-stage phenol-formaldehyde resinous product which is syrupy at room temperature, contains water and other volatile material, and has a total volatile content of from 8% to 35% as determined by baking the resin in a shallow dish for twenty-four hours at 150° C., of which volatile content at least 6% and not more than 28% is water, based on the weight of said syrupy resin, which comprises mixing said syrupy resin, a filler, and a dry alkaline earth metal oxide in an amount between 1% and 15% based on the weight of said syrupy resin to impart coagulability to said syrupy resin; and allowing said mixture to react to form a coagulated plastic product containing substantially the same amount of volatile material as the said syrupy resin.

3. The process of claim 2, wherein the dry oxide is magnesium oxide.

4. The process of claim 2, wherein the dry oxide is magnesium oxide and said oxide is present in an amount between 2% and 6%.

5. The process of claim 2, wherein, of the total volatile content of the syrupy resin at least 12% and not more than 15% is water based on the weight of said syrupy resin, the filler is relatively long-fibered asbestos, the dry oxide is magnesium oxide and said oxide is present in an amount between 2% and 6%.

6. A heat-convertible molding composition in the form of a coagulated plastic product which is capable of being directly molded under heat and pressure, comprising a coagulated reacted mixture of a heat-convertible one-stage phenol-formaldehyde resinous product which is syrupy at room temperature, contains water and other volatile materials, and has a total volatile content of from 8% to about 35% as determined by baking the resin in a shallow dish for twenty-four hours at 150° C., of which volatile content at least 6% and not more than 28% is water, based on the weight of said syrupy resin; and a dry oxide selected from the group consisting of the alkali metal oxides and the alkaline earth metal oxides in an amount between 1% and 15% based on the weight of said syrupy resin to impart coagulability to said syrupy resin, the said product containing substantially the same amount of volatile material as the said syrupy resin.

7. A heat-convertible molding composition in the form of a coagulated plastic product which is capable of being directly molded under heat and pressure, comprising a coagulated reacted mixture of a heat-convertible one-stage phenol-formaldehyde resinous product which is syrupy at room temperature, contains water and other volatile material, and has a total volatile content of from 8% to 35% as determined by baking the resin in a shallow dish for twenty-four hours at 150° C., of which volatile content at least 6% and not more than 28% is water, based on the weight of said syrupy resin, a dry alkaline earth metal oxide in an amount between 1% and 15% based on the weight of said syrupy resin to impart coagulability to said syrupy resin, and a filler, the said product containing substantially the same amount of volatile material as the said syrupy resin.

8. The product of claim 7, wherein the dry oxide is magnesium oxide.

9. The product of claim 7, wherein the dry oxide is magnesium oxide and said oxide is present in an amount between 2% and 6%.

10. The product of claim 7, wherein of the total volatile content of the syrupy resin at least 12% but not greater than 15% is water based on the weight of said syrupy resin, the filler is relatively long-fibered asbestos, the dry oxide is magnesium oxide, and said oxide is present in an amount between 2% and 6%.

WILLIAM H. ADAMS, Jr.

REFERENCES CITED

The following references are of record in the file of this patent:

UNITED STATES PATENTS

| Number | Name | Date |
|---|---|---|
| 2,041,453 | Bender | May 19, 1936 |
| 1,126,926 | Wiechmann | Feb. 2, 1915 |
| 2,354,479 | Rosenthal | July 25, 1944 |

FOREIGN PATENTS

| Number | Country | Date |
|---|---|---|
| 128,477 | Great Britain | June 26, 1919 |

Certificate of Correction

Patent No. 2,424,787. July 29, 1947.

WILLIAM H. ADAMS, Jr.

It is hereby certified that the address of the assignee in the above numbered patent was erroneously described and specified as "Newark, New Jersey" whereas said address should have been described and specified as *Newark, Delaware*, as shown by the record of assignments in this Office; and that the said Letters Patent should be read with this correction therein that the same may conform to the record of the case in the Patent Office.

Signed and sealed this 23rd day of September, A. D. 1947.

[SEAL]

THOMAS F. MURPHY,
*Assistant Commissioner of Patents.*